US008898571B2

(12) United States Patent
Hasegawa et al.

(10) Patent No.: US 8,898,571 B2
(45) Date of Patent: Nov. 25, 2014

(54) GUI-BASE APPLICATION SYSTEM AND METHOD FOR DISPLAYING WARNINGS OF THE SAME

(75) Inventors: Tohru Hasegawa, Sagamihara (JP); Yuhko Hasegawa, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/187,384

(22) Filed: Jul. 20, 2011

(65) Prior Publication Data

US 2012/0072862 A1 Mar. 22, 2012

(30) Foreign Application Priority Data

Sep. 24, 2010 (JP) ................. 2010-210912

(51) Int. Cl.
G06F 3/00 (2006.01)
G06F 3/048 (2013.01)
G06F 9/44 (2006.01)
(52) U.S. Cl.
CPC .............. G06F 3/048 (2013.01); G06F 9/4443 (2013.01)
USPC ........... 715/745; 715/708; 715/709; 715/710; 715/789; 715/811
(58) Field of Classification Search
CPC . G06F 3/0481; G06F 3/04817; G06F 3/0482; G06F 3/04883; G06F 9/4443; G06F 9/4446; G06F 3/038
USPC .................. 715/707–713, 744–745, 789, 811
See application file for complete search history.

(56) References Cited

U.S. PATENT DOCUMENTS

| 6,486,898 | B1* | 11/2002 | Martino et al. | 715/853 |
| 2008/0306930 | A1* | 12/2008 | Diederiks et al. | 707/5 |
| 2009/0327915 | A1* | 12/2009 | Holdaway et al. | 715/745 |
| 2012/0047129 | A1* | 2/2012 | Redstone et al. | 707/723 |

FOREIGN PATENT DOCUMENTS

| JP | 05029962 A | 2/1993 |
| JP | 11238034 | 8/1999 |
| JP | 2004252962 A | 9/2004 |
| JP | 2006018387 A | 1/2006 |
| JP | 2009259127 A | 11/2009 |

* cited by examiner

*Primary Examiner* — Amy Ng
*Assistant Examiner* — Claudia Dragoescu
(74) *Attorney, Agent, or Firm* — Griffiths & Seaton PLLC

(57) ABSTRACT

A display apparatus includes means for recording numbers and display times of a series of plurality of setting screens displayed in transition, means for assigning the degrees of forgetting of the current screen which is shifted from other setting screens that are displayed in the process of transition from the previous setting screen to the current screen, means for evaluating the total degree of forgetting of the current screen in consideration of all degrees of forgetting in transition from the other setting screens displayed in the process of transition, means for determining forgetting threshold values for the individual screens on the basis of the degree of importance of the application, means for comparing total degree of forgetting with the forgetting threshold values, and means for highlighting a predetermined content of the current screen in the case where the total degree of forgetting is lower than the forgetting threshold values.

5 Claims, 3 Drawing Sheets

MANAGEMENT SCREEN IN VIRTUAL-TAPE SERVER APPLICATION PROGRAM

CONTENT OF SCREEN:
FOR EXAMPLE, THREE WARNING MESSAGES
HYDME0598W, HYDME0613W, HYDME0586W

FIG. 2

OPERATION-SCREEN TRANSITION HISTORY TABLE
· LATERAL DIRECTION: SCREEN-ID TRANSITION DIRECTION
· WARNING MESSAGE: W1, W2, W3, ..., Wx

SCREEN TRANSITION DIRECTION →

TOTAL DEGREE OF FORGETTING L(3): THE DEGREE OF FORGETTING PREVIOUS SCREEN CONTENT (WARNING)

PREVIOUS ←→ CURRENT

| SETTING SCREEN ID | 2 | 5 | 1 | 2 | 3 | 5 | 4 | 2 | 1 | 5 | 3 |
|---|---|---|---|---|---|---|---|---|---|---|---|
| DISPLAYED WARNING ID | W1 | W2 W5 | | W1 | Wx | W2 W5 | | W1 W3 | | W2 W3 W5 | Wx |
| DISPLAY TIME t | 5 SEC. | 5 SEC. | 2 SEC. | 3 SEC. | 3 SEC. | 5 SEC. | 3 SEC. | 10 SEC. | 3 SEC. | 5 SEC. | 3 SEC. |
| DEGREE OF FORGETTING $V(i,j)$ $\left(\dfrac{1}{R(i,j)}\right)$ | | | | | V(3,3) | V(3,5) | V(3,4) | V(3,2) | V(3,1) | V(3,5) | |

GUI-BASE APPLICATION SYSTEM AND METHOD FOR DISPLAYING WARNINGS OF THE SAME

PRIORITY DATA

This application claims priority to Japanese Patent Application No. 2020-210912, filed Sep. 21, 2010, which is hereby incorporated by reference in its entirety.

BACKGROUND

1. Technical Field

The present invention relates to a method, an apparatus, and a program for displaying, for the same setting screen operated by an operator who executes an application, the content of a currently displayed setting screen (current setting screen) through a series of screen transition operations from a previously displayed setting screen (previous setting screen).

2. Description of the Related Art

In changing system settings using a graphical user interface (GUI) for system management, warning messages are sometimes displayed for attracting user's attention. For the system of complicated application programs, preconditions for changing the settings are complicated, and thus, a plurality of warning messages are sometimes displayed on one setting screen (also simply referred to as "screen").

BRIEF SUMMARY

FIG. 1 shows a specific example of a setting screen displayed in an application program. For example, a virtual tape server (IBM Virtualization Engine TS7700) has a management Web interface, which provides setting screens for a configuration running state or the like. Three warning messages (HYDME0598W, HYDME0613W, and HYDME0586W) are displayed on one management screen. These three warning messages are expressed as warning displays W1, W2, and W3.

In one application program, similar setting changes are often performed using setting screens many times on which a plurality of messages are displayed. In the case where the operator returns to a previous screen through transition of a plurality of screens between the same screens, the operator is used to the state in which the warning messages are displayed on the screen. Even if a warning message different from the warning messages displayed on the previous screen is displayed, the operator may overlook it.

In the case of a management setting screen for the application program of TS7700, it is necessary to change 32 storage pools of the TS7700 one by one when the application program is implemented into its program storage server. This is because the individual 32 storage pools can be given different properties. In this case, the same setting screen is displayed 32 times through other several screens. Therefore, even if a different warning message is added to the 31st screen, the operator may overlook it.

Particularly for such a virtual tape drive, a system operator operates virtual logical volumes on a setting screen from the host. Through the operator's operation, the physical volumes are, automatically, asynchronously assigned to a physical drive or a tape cartridge in the virtual tape server (TS7700 program).

For such an application system, the operator checks information on the physical volumes and the physical drive using a management interface. In this checking, the operator sometimes finds out that the physical volumes or the physical drive has come to an unexpected state due to an automatic operation in the drive. For example, after the operator confirms that the physical drive is in an unused state, the physical volumes are updated. After a sufficient time has passed from the update (after one hour later, for example), the operator checks the state of the physical drive. The application is sometimes executed due to the movement of setting screens; for example, the physical drive is still in use even though a sufficient time has passed from the checking.

In such a case, a warning message different from the previous one needs to be particularly displayed for the operator. An example of the warning message is that the configuration of the physical drive in use cannot be changed. However, in the case where a plurality of warning messages are displayed, a new warning message is sometimes overlooked because of a careless operation from experience.

To solve the problem described above, Japanese Unexamined Patent Application Publication No. 10-40060 provides a technology for changing a display message in accordance with the degree of learning set by the operator and restoring the display message with a lapse of time. The operator changes the display message in accordance with a display level (the degree of learning) that the operator himself/herself has set on the basis of intuitive and subjective expectation. In this literature, time is the only factor in the case where, once a storage-pool setting screen is opened, a physical-volume setting screen that is closely related thereto is viewed for a while. With the time factor only, the appearance of warnings is the same as that of unfamiliar warnings. Thus, even if the operator remembers the previous setting operation clearly, the same warning messages as the previous ones are displayed persistently. Accordingly, even if a warning message different from the previous ones is displayed, there is a high possibility that the operator may overlook it.

In the case where the operator remembers previous setting screens clearly, it is necessary to make a display content (for example, a warning message) on a screen different from the previous setting screens prominent to attract operator's attention. Thus, the present invention defines, for the same setting screen, susceptibility to forgetting the previous setting screens (the degrees of forgetting) for the current setting screen from the degree of relevance between the historical operation screens between the previous setting screen and the current setting screen. The present invention provides a method for preventing overlooking a slight change in display due to a memory-dependent operation in the case where the degree of forgetting is low.

An object of the present invention is to provide a method, an apparatus, and a program for displaying, for the same screen, the content of a current setting screen in the case where a series of screen displays change between a previous setting screen and a current setting screen.

The present invention that achieves the above object is a method for displaying, for the same setting screen, the content of a currently displayed setting screen (current setting screen) shifted from a previously displayed setting screens (previous setting screen) in a GUI-base message display apparatus that executes an application by shifting the display of a series of setting screens (1, 2, 3, . . . , i, . . . , j, . . . , and i).

The screen-content display method of the present invention includes the steps of:

recording the numbers and display times of a series of plurality of setting screens displayed in transition; assigning the degrees of forgetting $V(i, j)$ of the current screen i (susceptibility to forgetting the screens j in screen transition j→i) which is shifted from the other setting screens j that are displayed in the process of transition from the previous setting screen i to the current screen i;

evaluating the total degree of forgetting L(i) of the current screen i (susceptibility to forgetting the previous setting screens) in consideration of all the degrees of forgetting V(i, j) in transition from the other setting screens j displayed in the process of transition;

determining forgetting threshold values N(i) to the individual screens on the basis of the degree of importance of the application;

comparing the total degree of forgetting L(i) with the forgetting threshold values N(i); and highlighting a predetermined content of the current screen in the case where the total degree of forgetting L(i) is lower than the forgetting threshold values N(i).

In this display method, in the step of evaluating the total degree of forgetting L(i), the degrees of forgetting V(i, j) in the case where the current screen i shifts from the individual screens j displayed in the process of transition are independently added.

In this display method, the total degree of forgetting L(i) is the sum total of the degrees of forgetting V(i, j) of the current screen i shifted from the individual screens j in the process of transition.

In this display method, the total degree of forgetting L(i) is the sum total of the products of the degrees of forgetting V(i, j) of the current screen i shifted from the individual screens j in the process of transition and display times Tj at the individual screens j.

In this display method, the degrees of forgetting V(i, j) of the current screen i shifted from the individual setting screens j in the process of transition are defined by relevance ratios R (i, j) between the individual setting screens j in the process of transition from the previous screen i to the current screen i and the current setting screen i (the degree of screen transition operation j→i).

In this display method, the degrees of forgetting V(i, j) of the current screen i shifted from the individual screens j are defined in inversely proportional to the relevance ratios R(i, j).

In this display method, the relevance ratios R(i, j) are given by digitizing the degree of transition operation from the screen j to the screen i in accordance with the degree of transition operation between the screens of the application.

In this display method, the forgetting threshold values N(i) are determined as threshold values in accordance with the degrees of importance of the individual screens i in the application.

Furthermore, the present invention that achieves the above object is a GUI-base message display apparatus that executes an application by shifting the display of a series of setting screens.

The display apparatus of the present invention includes:

means for recording the numbers and display times of a series of plurality of setting screens displayed in transition;

means for assigning the degrees of forgetting of the current screen which is shifted from other setting screens that are displayed in the process of transition from the previous setting screen to the current screen;

means for evaluating the total degree of forgetting of the current screen in consideration of all the degrees of forgetting in transition from the other setting screens displayed in the process of transition;

means for determining forgetting threshold values for the individual screens on the basis of the degree of importance of the application;

means for comparing the total degree of forgetting with the forgetting threshold value; and means for highlighting a predetermined content of the current screen in the case where the total degree of forgetting is lower than the forgetting threshold values.

Furthermore, the present invention that achieves the above object is a program product for GUI-base message display that executes an application by shifting the display of a series of setting screens.

The program product of the present invention includes:

computer-usable program code for recording the numbers and display times of a series of plurality of setting screens displayed in transition;

computer-usable program code for assigning the degrees of forgetting (susceptibility to forgetting) of the current screen which is shifted from other setting screens that are displayed in the process of transition from the previous setting screen to the current screen;

computer-usable program code for evaluating the total degree of forgetting of the current screen in consideration of all the degrees of forgetting in transition from the other setting screens displayed in the process of transition;

computer-usable program code for determining forgetting threshold values for the individual screens on the basis of the degree of importance of the application;

computer-usable program code for comparing the total degree of forgetting with the forgetting threshold values; and computer-usable program code for highlighting a predetermined content of the current screen in the case where the total degree of forgetting is lower than the forgetting threshold values.

With the foregoing means, the present invention offers the advantageous effect of highlighting screen content by evaluating the susceptibility to forgetting the individual screens in the process of transition from the same setting screen back to the current setting screen. This display apparatus can display only differences from the previous screen so that they are conspicuous on the current setting screen.

BRIEF DESCRIPTION OF DRAWINGS

FIG. 2 shows a setting-screen transition history table for a series of screen displays of an application operation.

DETAILED DESCRIPTION OF THE DRAWINGS

Figure 1:
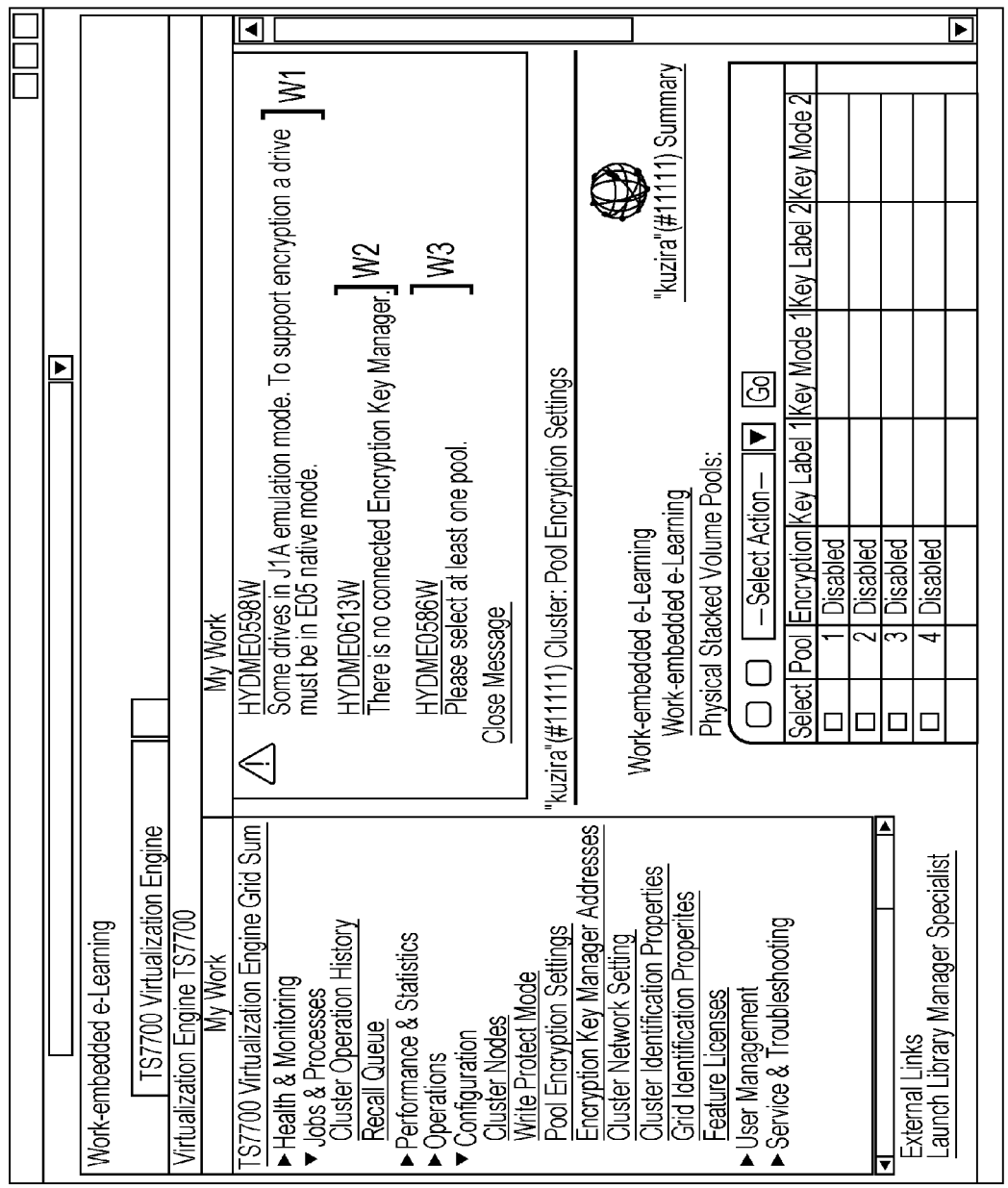
FIG. 1 shows a specific example of a setting screen displayed in an application program.

Typical embodiments (hereinafter referred to as "embodiments") of a method for highlighting warning messages in transition of application management screens of the present invention will be described hereinbelow. It is to be understood that these embodiments are provided for illustrative purpose only and do not limit the display method of the present invention.

The method employs ease of movement between two setting screens (a transition from a screen j to a screen i, hereinafter referred to as "j→i") and the degree of relevance between the two setting screens (relevance ratio R(i, j)). R(i, j) is obtained by an application designer and an application operator (hereinafter also referred to as "operator") quantifying (digitizing) the degree of movement between the two screens in accordance with the characteristics of the application program.

From a setting-screen operation history, the degree of forgetting $V(i, j)$ is determined from the relevance ratio $R(i, j)$ after the previous setting screen is displayed until the same setting screen is displayed. In the case where the degree of forgetting is low, it is determined that the operator clearly remembers the previous setting operation, and thus, a warning message different from the previous one is highlighted to make it prominent. In the case where the degree of forgetting is high, the operator carefully sees the current screen display because the operator does not remember the previous setting screen clearly due to the transition operation. Thus, the warning messages may be displayed at a normal display level. The degree of forgetting $V(i, j)$ indicates susceptibility to forgetting the previous screen i in the case where the same setting screen i is a transition screen that is displayed again through a specific setting screen j (i→j→i).

Suppose a case in which the currently displayed screen i (current screen i) is displayed on the monitor in a transition of the previous screen i→the intermediate screen j→the current screen i. The degree of forgetting is obtained by quantifying the memory of the operator about the content of the setting screen (previous setting screen) i that is previously displayed via the intermediate screen j. The degree of forgetting $V(i, j)$ is given as the reciprocal of the relevance ratio $R(i, j)$ of the transition operation of the screen j→i.

Since the intermediate screen j is interposed between the previous screen i and the current screen i irrespective of a lapse of time, memory about the previous screen i is generally gradually lost. For the degree of losing the memory, the intervention of the intermediate screen j does not obstruct the memory on the previous screen i when the relevance ratio $R(i, j)$ of the transition of the intermediate screen j→i is high (large). In the case where the relevance ratio $R(i, j)$ of the transition between the intermediate screen j and the screen i is high, the degree of forgetting $R(i, j)$ is low because the previous screen i is easy to remember (familiar thereto because it is in operator's memory) even if the screen j is interposed during the transition of the same screen i→i. In the case where the relevance ratio $R(i, j)$ between the two setting screens (i and j) is low (small), the degree of forgetting $V(i, j)$ takes a large value because the display content of the previous screen i is susceptible to forgetting (unfamiliar thereto because it is not in operator's memory) because of the intervention of the intermediate screen j.

FIG. 2 shows a setting-screen transition history table (hereinafter referred to as a history table) for a series of screen displays of an application operation. The present invention provides a method for evaluating the total degree of forgetting of the same previous screen in consideration of the relevance ratio R to all transition screens (the reciprocal of the degree of forgetting V) and setting the display level of the current setting screen. Since the higher the relevance ratio $R(i, j)$, the more the operator remembers changes between the screens, the previous screen is easy to remember, in other words, the degree of forgetting $V(i, j)$ is low. In the case where the relevance ratio $R(i, j)$ is low, changes between the screens are difficult to remember, and thus, the degree of forgetting $V(i, j)$ is high.

The total degree of forgetting obtained through a series of screen transitions from the previous screen i to the current screen j with a lapse of time is given as the total degree of forgetting $L(i)$ as follows. In the case where the total degree of forgetting $L(i)$ is low, the operator may overlook the content of the current screen i (warning messages) because he/she is familiar thereto. In the case where the total degree of forgetting $L(i)$ is high, the operator may carefully see the content of the current screen i with a consciousness of his/her first sight because he/she does not remember the previous screen i clearly.

The history of temporal transition of a specific series of screen displays will be described.

The individual setting screens are given IDs (1, 2, 3, ... N), which show a screen transition direction from the left to the right with a lapse of time under the control of the operator. Reference signs W1, W1, W3, ... Wx denote warning messages displayed on the individual screens. Suppose that the operator observes the content of the setting screens with IDs displayed on the monitor for the display times.

In the case where the individual setting screens are given corresponding IDs (1, 2, 3, ... N), the relevance ratio $R(j, i)$ between the setting screens j and i, that is, the degree of forgetting $V(i, j)(t)$, is statistically set. The degree of forgetting $V(i, j)$ is inversely proportional to the relevance ratio $R(i, j)$, as described above. Although the degree of forgetting $V(i, j)$ may be a function of the display time (for example, a linear function), it is human's normal memory characteristic that memory on the previous screen decays with a lapse of display time t.

The relevance ratio $R(i, j)$ and the reciprocal thereof, the degree of forgetting $V(i, j)$, are determined from characteristics between the setting screens i and j in the application program. The relevance ratio $R(i, j)$ indicates the degree of possibility that the operator moves the screen from the screen j to the screen i in a typical application setting screen operation scenario. For the designer and operator of the application, the fact that the degree of transition between the two screens j and i, that is, the relevance ratio $R(i, j)$, is high indicates that the content on the screen j is easy to remember. In this case, the degree of forgetting $V(i, j)$ (the reciprocal of R) is low. That is, the operator tends not to carefully see the current screen in dependence on memory on the previous screen. Thus, it is necessary to highlight the content on the current screen, or changes (differences) from the previous screen in executing the application program.

The degree of forgetting $V(i, j)$ is digitized possibility of operation of transition of j→i between the two screens in application characteristics. In the case where the possibility of transition is high, a low degree of forgetting $V(i, j)$ (the reciprocal of a high relevance ratio $R(i, j)$) is assigned to the transition of screen j→i. In this case, the relevance ratio $R(i, j)$ is high. The operator remembers the screen (warning messages) clearly, and thus does not carefully read the content (the warning messages) with the misunderstanding that the current screen has the same content. In the case where the possibility of transition is low, a high degree of forgetting $V(i, j)$ (the reciprocal of a low relevance ratio $R(i, j)$) is assigned to the transition of screen j→i. This indicates that the transition from the previous to the current screens is little, which may cause the operator to be prone to forgetting the characteristics of the previous screen, and thus carefully reads the content of the current screen, for example, the warning messages.

Next, a threshold value $N(i)$ of the total degree of forgetting $L(i)$ of the setting screen i is set. The threshold value $N(i)$ is a reference value of the degree of forgetting set for each screen i during a fixed time from the viewpoint of the program designer and the operator. In the case where the setting screen i is easy to remember, a large value is set to $N(i)$, and in the case where it is difficult to remember, a small value is set from the viewpoint of the operator, that is, the degree of importance or complication of the individual setting screens.

The history table shown in FIG. 2 lists the history of transition of operation screens, the IDs of warning messages displayed on the individual screens, and times during which the setting screens are displayed (referred to as display times). Since the history is limited in installation, a certain degree of transition is recorded.

FIG. 2 shows a specific example of the history table. In this example, the ID of a setting screen displayed is added to the right of the table. For example, the rightmost setting screen of setting screens with ID=5 displays warnings corresponding to warning messages W2, W3, and W5, which is displayed for five seconds.

The total degree of forgetting L(i) is defined using the degree of forgetting V(i, j) relative to the individual screens during transition with reference to the history table in FIG. 2. First, let S(i) be a set of setting screens displayed after the previous setting screen i is opened until it is opened again. In the example of the foregoing history table, a set S(3) in the case where a setting screen 3 is opened after the previous setting screen 3 is opened is {5, 1, 2, 4, 5}.

The setting screen displayed at the rightmost end has ID=3 (current setting screen 3). The set S(3) shows transition of a series of setting screens between the current screen 3 and the previous setting screen 3 (3→5→4→2→1→5→3). The total degree of forgetting L(3) of the current screen 3 to the previous setting screen 3 indicates independent evaluations on the relationship with the individual setting screens (5, 4, 2, 1, and 5 from the left) during transition. The total degree of forgetting L(3) is obtained by overlaying the degrees of forgetting V(3, j) of the setting screens j (5, 4, 2, 1, and 5 from the left) from which the current setting screen 3 shifts independently. Specifically, L(3) is obtained by summing up the degrees of forgetting R(3, j) (j=5, 4, 2, 1, and 5). The degree of forgetting V(3, 3) in the case where the current setting screen 3 is directly shifted from the previous setting screen 3 is set to zero because it is completely remembered, and is not taken into consideration in the calculation of the total degree of forgetting L(3).

Here, L(i) is defined as follows:

$$L(i) = \sum_{j \in S(i)} V(i, j) \times t_j \quad \text{[Formula 1]}$$

where tj is the display time of the screen j. The equation of the total degree of forgetting L(i) is the sum of the products of the degrees of forgetting V(i, j) and the corresponding display times tj; alternatively, the degrees of forgetting V(i, j) may be summed up as a linear function of the corresponding display times. In this case, the individual degrees of forgetting can be expressed as V(i, j)(tj)=V(i, j)×tj.

The total degree of forgetting of the current screen 3 of the operation screen transition history in FIG. 2 can be given as follows:

L(3)=V(3,5)×5+V(3,4)×3+V(3,2)×10+V(3,1)×3V(3,5)×5

Figure 3:
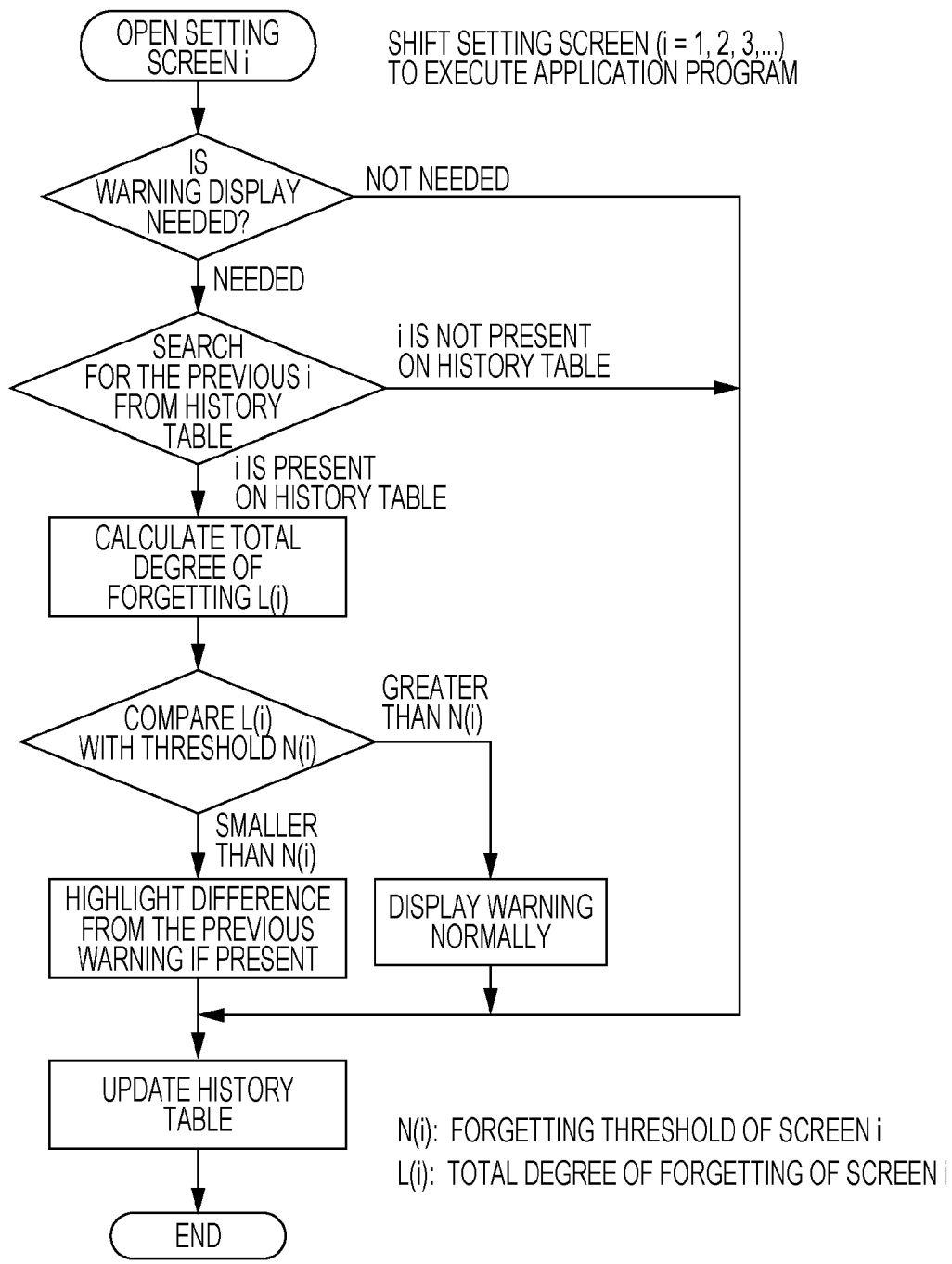
FIG. 3 shows a flowchart of an embodiment of the present invention.

FIG. 3 shows a flowchart of an embodiment of the present invention.

First, when the setting screen i is opened, it is determined whether a warning display is needed. If it is not needed, the setting screen i is normally displayed. If it is needed, the previous setting screen i is searched for from the history table. Only when it is on the history table, the total degree of forgetting L(i) is calculated. Next, the total degree of forgetting L(i) is compared with the forgetting threshold value N(i). If the total degree of forgetting L(i) is larger than the threshold value N(i), it is determined that the operator does not remember the previous setting clearly, and warnings are displayed normally. If the total degree of forgetting L(i) is smaller than the threshold value N(i), it is determined that the operator remembers the previous setting clearly, and differences from the previous warnings are highlighted. This method allows the appearance of warning messages to be changed in accordance with how much time is consumed for unrelated matters after a setting operation is performed until the next similar operation is performed.

There are various methods for changing the appearance of warning messages as follows. Any implementation method can be achieved with reference to the foregoing.

Examples of the appearance of warning messages are as follows:

Changing the colors of only differences.

Highlighting the characters of only differences.

Displaying only differences at a conspicuous place.

Examples of the setting screen of TS7700 include the storage-pool setting screen (ID=1) shown in FIG. 1, a physical-volume setting display screen (ID=2), and an IP-address setting screen (ID=3). They differ in the degree of relevance of contents. For example, confirming a change in the setting of the storage pool on a physical volume setting screen is a typical scenario. Furthermore, setting an IP address has no relevant to those operations. If how to use the product is known, the degree of forgetting can be set to the display time t as a function.

For example, $V(1,2)(t)=t$ $V(2,1)(t)=t$ $V(1,3)(t)=5t$ $V(3,1)(t)=10t$ $V(2,3)(t)=3$ $V(3,2)(t)=10t$ (t: in seconds)

Furthermore, since the time required to execute a typical scenario, for example, is obvious from the specifications of the product, the forgetting threshold value N can be defined for each product. In the example of TS7700 described above, the threshold value N can be defined as follows:

$N(1)=30$ $N(2)=100$ $N(3)=50$

In the above example, since the degree of forgetting is a function of the time (or display time) t, it is necessary to consider a case where the screen is left open (long display time). Even if the display time t is long, there is an idle time during which the display state is left as it is and the operator enters nothing on the screen. Even if the display time is such an idle time, the operator may not have forgotten the previous operation (for example, the content of the previous screen) so much. In the case where an idle time is present in the display time t, the degree of forgetting V(i, j) is expressed as the following equation for the sake of convenience:

$$V(i, j) = t \ (t < T1) = T1 + 1/t2 \ (t \geq T1)$$

where T1 is the threshold limit of the average display time of the screen i.

With this equation, the influence of the kept-open state can be reduced from the assigned degree of forgetting. The threshold limit T1 in this equation can be determined depending on the characteristics of the product.

The calculation of the degree of forgetting $V(i, j)(t)$ is not limited to the foregoing equation, and other evaluation formulas that can take in contemplation of irrelevant time for the operator are also included in the scope of the present invention.

The display method of the present invention evaluates the degree of forgetting in screen operation in the process of transition to the same screen as the previous screen in consideration of the degree of movement from the individual screens during the transition.

The display method allows screen display on the basis of the degree of forgetting of the current setting screen in consideration of how much time the individual setting screens are displayed. Furthermore, the present invention can not only determine the degree of forgetting only from the time factor but also, supposing that transition is made from other related screens in the process of transition, can change the appearance of warning messages in consideration of the degrees of forgetting from all the transition screens. Finally, the highlighting method of the present invention has the advantageous effect of displaying only differences from the previous screen display at a conspicuous place on the current setting screen.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

The invention claimed is:

1. A method for displaying, for a same setting screen, content of a current setting screen shifted from a previous setting screen in a GUI-base message display apparatus that executes an application by shifting display of a series of setting screens $(1, 2, 3, \ldots, i, \ldots, j, \ldots,$ and i) and determine when to highlight a predetermined content of the current setting screen i, the method comprising the steps of:

recording numbers and display times of a series of a plurality of setting screens displayed in a process of transition using a processing device;

assigning, using the processing device, degrees of forgetting $V(i, j)$ of the current setting screen i which is shifted from other setting screens j that are displayed in the process of transition from a previous setting screen i to the current setting screen i;

evaluating, using the processing device, a total degree of forgetting $L(i)$ of the current setting screen i in consideration of all the degrees of forgetting $V(i, j)$ in transition from the other setting screens j displayed in the process of transition, wherein the degrees of forgetting $V(i, j)$ in the case where the current setting screen i shifts from the individual setting screens j displayed in the process of transition are independently added, the total degree of forgetting $L(i)$ is a sum total of the products of the degrees of forgetting $V(i, j)$ of the current setting screen i shifted from individual setting screens j in the process of transition and the display times Tj at the individual screen settings j, the degrees of forgetting $V(i, j)$ of the current setting screen i shifted from the individual setting screens j in the process of transition are defined by inversely proportional relevance ratios $R(i, j)$ between the individual setting screens j in the process of transition from the previous setting screen i to the current setting screen i and the current setting screen i, and the relevance ratios $R(i, j)$ are given by quantifying the degree of transition operation from the individual setting screens j to the current setting screen i in accordance with the degree of transition operation between the setting screens of the application;

determining, using the processing device, forgetting threshold values $N(i)$ to individual setting screens on a basis of degree of importance of the application; comparing, using the processing device, the total degree of forgetting $L(i)$ with the forgetting threshold values $N(i)$; and highlighting, using the processing device, a predetermined content of the current setting screen i in a case where the total degree of forgetting $L(i)$ is lower than the forgetting threshold values $N(i)$.

2. The method according to claim 1, wherein the forgetting threshold values $N(i)$ are determined as threshold values in accordance with the degrees of importance of the individual setting screens i in the application.

3. A GUI-base message display apparatus including a processor that executes an application by shifting display of a series of setting screens and determines when to highlight a predetermined content of the current setting screen i, the display apparatus comprising:

means for recording, by the processor, numbers and display times of a series of plurality of setting screens displayed in a process of transition;

means for assigning, by the processor, degrees of forgetting of a current setting screen which is shifted from other setting screens that are displayed in the process of transition from a previous setting screen to the current setting screen;

means for evaluating, by the processor, a total degree of forgetting of the current setting screen in consideration of all the degrees of forgetting in transition from the other setting screens displayed in the process of transition, wherein the degrees of forgetting $V(i, j)$ in the case where the current setting screen i shifts from the individual setting screens j displayed in the process of transition are independently added, the total degree of forgetting $L(i)$ is a sum total of the products of the degrees of forgetting $V(i, j)$ of the current setting screen i shifted from individual setting screens j in the process of transition and the display times Tj at the individual screen settings j, the degrees of forgetting $V(i, j)$ of the current setting screen i shifted from the individual setting screens j in the process of transition are defined by inversely proportional relevance ratios $R(i, j)$ between the individual setting screens j in the process of transition from the previous setting screen i to the current setting screen i and the current setting screen i, and the relevance ratios $R(i, i)$ are given by quantifying the degree of transition operation from the individual setting screens j to the current setting screen i in accordance with the degree of transition operation between the setting screens of the application;

means for determining, by the processor, forgetting threshold values for the individual setting screens on the basis of the degree of importance of the application;

means for comparing the total degree of forgetting with the forgetting threshold values;

and means for highlighting a predetermined content of the current setting screen in the case where the total degree of forgetting is lower than the forgetting threshold values.

4. A non-transient physical computer storage medium comprising a program product for GUI-base message display that executes an application by shifting display of a series of setting screens and determines when to highlight a predetermined content of the current setting screen i, the non-transient physical computer storage medium comprising:

computer-usable program code for recording numbers and display times of a series of plurality of setting screens displayed in a process of transition;

computer-usable program code for assigning degrees of forgetting of the current setting screen which is shifted from other setting screens that are displayed in the process of transition from the previous setting screen to the current setting screen;

computer-usable program code for evaluating the total degree of forgetting of the current setting screen in consideration of all the degrees of forgetting in transition from the other setting screens displayed in the process of transition, wherein the degrees of forgetting $V(i, i)$ in the case where the current setting screen i shifts from the individual setting screens i displayed in the process of transition are independently added, the total degree of forgetting $L(i)$ is a sum total of the products of the degrees of forgetting $V(i, j)$ of the current setting screen i shifted from individual setting screens j in the process of transition and the display times Tj at the individual screen settings j, the degrees of forgetting $V(i, j)$ of the current setting screen i shifted from the individual setting screens j in the process of transition are defined by inversely proportional relevance ratios $R(i, j)$ between the individual setting screens j in the process of transition from the previous setting screen i to the current setting screen i and the current setting screen i, and the relevance ratios $R(i, j)$ are given by quantifying the degree of transition operation from the individual setting screens j to the current setting screen i in accordance with the degree of transition operation between the setting screens of the application;

computer-usable program code for determining forgetting threshold values for the individual setting screens on the basis of the degree of importance of the application;

computer-usable program code for comparing the total degree of forgetting with the forgetting threshold values; and computer-usable program code for highlighting a predetermined content of the current setting screen in the case where the total degree of forgetting is lower than the forgetting threshold values.

5. The non-transient physical computer storage medium according to claim 4, wherein the forgetting threshold values are determined as threshold values in accordance with the degrees of importance of the individual setting screens in the application.

* * * * *